United States Patent
Sonobe et al.

(10) Patent No.: US 6,569,570 B2
(45) Date of Patent: *May 27, 2003

(54) CARBONACEOUS ELECTRODE MATERIAL FOR SECONDARY BATTERY

(75) Inventors: Naohiro Sonobe, Fukushima-ken (JP); Minoru Ishikawa, Fukushima-ken (JP); Jiro Masuko, Fukushima-ken (JP)

(73) Assignee: Kureha Kagaku Kogyo Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/355,481

(22) PCT Filed: Feb. 3, 1998

(86) PCT No.: PCT/JP98/00439
§ 371 (c)(1),
(2), (4) Date: Oct. 18, 1999

(87) PCT Pub. No.: WO98/35396
PCT Pub. Date: Aug. 13, 1998

(65) Prior Publication Data
US 2002/0039686 A1 Apr. 4, 2002

(30) Foreign Application Priority Data
Feb. 6, 1997 (JP) .................................. 9-36892

(51) Int. Cl.[7] .................................. H01M 4/58
(52) U.S. Cl. .................................. 429/231.8
(58) Field of Search .................. 429/231.8, 218.1; 423/593, 414; 252/502

(56) References Cited

U.S. PATENT DOCUMENTS

| 4,615,959 | A | * | 10/1986 | Hayashi et al. | 429/194 |
| 4,725,422 | A | * | 2/1988 | Miyabayashi et al. | 423/445 |
| 5,225,296 | A | * | 7/1993 | Ohsawa et al. | 429/218 |
| 5,721,071 | A | * | 2/1998 | Sonobe et al. | 429/218 |

FOREIGN PATENT DOCUMENTS

| EP | 0480909 | 4/1992 |
| EP | 0700106 | 3/1996 |
| GB | 2296125 | 6/1996 |

* cited by examiner

Primary Examiner—Randy Gulakowski
Assistant Examiner—Monique Wills
(74) Attorney, Agent, or Firm—Wenderoth, Lind & Ponack, L.L.P.

(57) ABSTRACT

A carbonaceous electrode having improved capacities for doping and dedoping of a cell active substance, such as lithium, and suitable for a non-aqueous secondary battery, is constituted by a carbonaceous material obtained by carbonizing an aromatic condensation polymer formed by condensation of an aromatic compound having a phenolic hydroxy group and an aldehyde. The carbonaceous material is characterized by an atomic ratio H/C between hydrogen atoms and carbon atoms of below 0.1, a carbon dioxide adsorption capacity of at least 10 ml/g, and an X-ray scattering intensity ratio $I_W/I_D$ of at least 0.25, wherein $I_W$ and $I_D$ represent scattering intensities as measured in a wet state and a dry state, respectively, at a parameter $s = 2 \cdot \sin \theta / \lambda$ of 0.5 $nm^{-1}$, wherein $\theta$ denotes a scattering angle and $\lambda$ denotes a wavelength of X-rays in X-ray small-angle scattering measurement.

7 Claims, 2 Drawing Sheets

CARBONACEOUS ELECTRODE MATERIAL FOR SECONDARY BATTERY

This application is a 371 application of International Application No. PCT/JP98/00439 filed Feb. 3, 1998.

TECHNICAL FIELD

The present invention relates to a carbonaceous electrode material for a secondary battery. More particularly, the present invention relates to a carbonaceous material having a large capacity for doping with a battery (or cell) active substance and suitable as an electrode material for a non-aqueous solvent-type secondary battery having a high energy density, and a process for production thereof.

BACKGROUND ART

Non-aqueous solvent-type lithium secondary batteries having a negative electrode comprising a carbonaceous material have been proposed as high energy density secondary batteries (Japanese Laid-Open Patent Application (JP-A) 57-208079, JP-A 62-90863, JP-A 62-122066, etc.). Such a secondary battery utilizes a phenomenon that lithium as a (cell) active substance easily dopes an carbonaceous material or is dedoped (i.e., released) from the carbonaceous material electrochemically. When the battery is charged, lithium in a positive electrode comprising a chalcogenide, such as $LiCoO_2$, is introduced between layers of negative electrode carbon (i.e., dopes the carbon) electrochemically. The carbon thus doped with lithium functions as a lithium electrode, from which the lithium is released (i.e., de-doped) during discharge to return to the positive electrode. Thus, a secondary battery capable of repetitive charge-discharge is formed.

In case where an electrode is composed of graphite or a carbonaceous material having a developed graphite structure, a graphite intercalation compound is formed to enlarge the spacing between the graphite layers when the carbonaceous material is doped with lithium. When the lithium introduced between the layers is dedoped, the graphite layer spacing is restored to the original state. Accordingly, in a carbonaceous material with a developed graphite structure, the repetition of enlargement/restoration of the graphite layer spacing is caused corresponding to the repetition of charge/discharge of a secondary battery, whereby the graphite crystal structure is liable to be broken. Accordingly, a secondary battery constituted by using a carbonaceous material with a developed graphite structure has been said to have an inferior charge/discharge repetition performance. It is further said that a battery using such a carbonaceous material having a developed graphite structure is liable to cause decomposition of the electrolytic solution at the time of operation of the battery.

On the other hand, it has been also proposed to use carbonaceous materials obtained by calcining phenolic resins as negative electrode materials for secondary batteries (e.g., JP-A 58-209864, JP-A 62-122066, JP-A 63-276873). However, in case where a negative electrode is constituted by using a carbonaceous material obtained by calcining a phenolic resin at a high temperature of, e.g., 1900° C. or higher, the resultant negative electrode is liable to have only small capacities of doping and dedoping of an active substance, such as lithium. Further, in case where a negative electrode is constituted by using a carbonaceous material obtained by heat-treating a phenolic resin at a relatively low temperature of, e.g., ca. 480–700° C., the resultant negative electrode advantageously has a large capacity of doping with lithium as the active substance but is accompanied with a problem that the lithium doping the negative electrode cannot be completely dedoped to leave a substantial amount of the lithium in the negative electrode, so that the lithium as the active substance is wasted uselessly.

DISCLOSURE OF INVENTION

In view of the above-mentioned problems, an object of the present invention is to provide a carbonaceous electrode material for a secondary battery capable of providing a non-aqueous solvent-type secondary battery having large charge/discharge capacities and having little irreversible capacity determined as a difference between a doping capacity and a dedoping capacity, thus being capable of effectively utilizing an active substance.

Another object of the present invention is to provide a process for producing such a carbonaceous electrode material and a secondary battery using such a carbonaceous electrode material.

In the course of our study for obtaining a high-performance carbonaceous electrode material more suitably used in a non-aqueous solvent-type secondary battery, it has been found possible to obtain a carbonaceous material capable of providing a non-aqueous solvent-type secondary battery having large charge/discharge capacities and little irreversible capacity (i.e., a large active substance utilization rate) by using a phenolic resin having a controlled structure as a starting material and subjecting the phenolic resin to an appropriately controlled carbonization process.

More specifically, according to the present invention, there is provided a carbonaceous electrode material for a secondary battery, comprising: a carbonization product of an aromatic condensation polymer formed by condensation of an aromatic compound having a phenolic hydroxy group and an aldehyde; and having an atomic ratio H/C between hydrogen atoms and carbon atoms of below 0.1, a carbon dioxide adsorption capacity of at least 10 ml/g, and an X-ray scattering intensity ratio $I_W/I_D$ of at least 0.25, wherein $I_W$ and $I_D$ represent scattering intensities as measured in a wet state and a dry state, respectively, at a parameter $s=2\cdot\sin\theta/\lambda$ of 0.5 $nm^{-1}$, wherein $\theta$ denotes a scattering angle and $\lambda$ denotes a wavelength of X-rays in X-ray small-angle scattering measurement.

The above-mentioned carbonaceous material according to the present invention has a large capacity for doping with an active substance of a secondary battery, such as lithium and has only a small value of so-called irreversible capacity, i.e., an amount of active substance caused to remain in the carbonaceous material without dedoping. By using such a carbonaceous material as an electrode material for constituting a non-aqueous solvent-type secondary battery, the resultant secondary battery is allowed to have large charge/discharge capacities and a high energy density.

The method for measuring the X-ray scattering intensity ratio $I_W/I_D$ will be described later.

It is further preferred that the carbonaceous material according to the present invention has an average layer plane spacing between (002) planes according to X-ray diffraction (hereinafter sometimes denoted by $d_{002}$) of at least 0.360 nm and at most 0.400 nm.

The carbonaceous material according to the present invention may preferably comprise a carbonization product of a resol-type phenolic resin, which is a condensation product between a phenol and an aldehyde. More specifically, the resol-type phenolic resin includes a condensation product initially obtained by reaction between an aromatic compound having a phenolic hydroxyl group and an aldehyde in the presence of a basic catalyst, and a resinous substance obtained by thermal curing of such an initial condensation product.

The carbonaceous material according to the present invention may be produced in the following manner.

More specifically, the carbonaceous material according to the present invention may be produced by carbonizing an aromatic condensation polymer, which is a condensation product between an aromatic compound having a phenolic hydroxyl group and an aldehyde, at a temperature of 1050–1400° C. under a pressure exceeding 10 kPa (=0.1 atm) while flowing an inert gas.

The carbonaceous material according to the present invention may also be produced by carbonizing an aromatic condensation polymer, which is a condensation product having a phenolic hydroxyl group and an aldehyde, at a temperature of 1050–1400° C. under a pressure of at most 10 kPa.

Herein, the inert gas may include an inert gas, such as nitrogen gas, argon gas or helium gas, and a gaseous mixture comprising such an inert gas, and a halogen gas, such as chlorine gas, in an amount of at most 40 mol % of the gaseous mixture.

The non-aqueous solvent-type secondary battery according to the present invention comprises a positive electrode, a negative electrode, and a separator and a non-aqueous electrolytic solution disposed between the positive and negative electrodes; at least one of the positive and negative electrodes comprising a carbonaceous material according to the present invention as described above.

DESCRIPTION OF PREFERRED EMBODIMENTS

Figure 1:
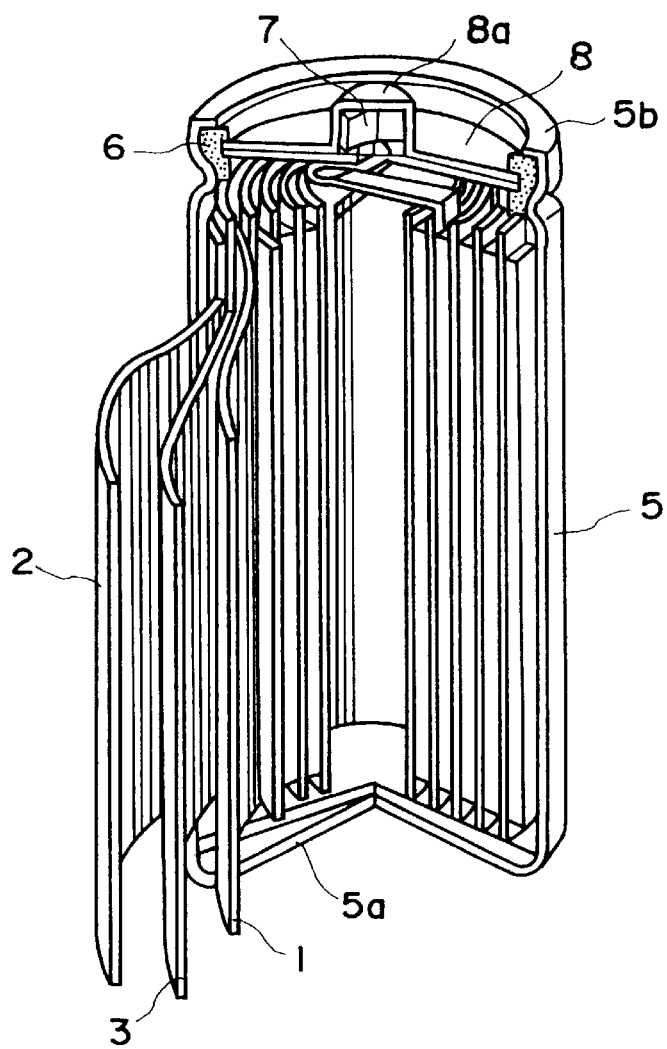
FIG. 1 is a partially exploded perspective view of a non-aqueous solvent-type secondary battery which can be constituted according to the invention.

The carbonaceous material according to the present invention is a so-called non-graphitizable carbon and has fine pores attributable to a disordered layer structure. Such pores attributable to a disordered layer structure can change depending on the degree of disorder of the carbon layer planes.

The micro-texture of a carbonaceous material obtained by carbonization of an aromatic condensation polymer can remarkably change depending on the crosslinked structure and conditions for carbonization of the aromatic condensation polymer.

The carbonaceous material according to the present invention may be obtained through a control of the crosslinked structure of the aromatic condensation polymer by controlling the condensation reaction conditions, such as the amount ratio between the aromatic compound having a phenolic hydroxyl group and the aldehyde, the reaction catalyst and the reaction temperature.

The formation of fine pores has been promoted by promoting the dissipation or liberation of decomposition gas and tar occurring during the calcination (i.e., carbonization) of the aromatic condensation polymer.

The carbonaceous material according to the present invention is characterized in that its low angle-side scattering intensity according to X-ray small-angle scattering is not remarkably lowered even when it absorbs moisture.

In contrast thereto, a class of carbonaceous material obtained by carbonization of a phenolic resin may cause a remarkable lowering in low angle-side scattering intensity by X-ray small angle scattering due to moisture absorption. Such a carbonaceous material is not desirable as a carbonaceous electrode material for secondary batteries because of a small doping capacity or a large irreversible capacity for an active substance.

The lowering in low angle-side scattering intensity in the X-ray small-angle scattering due to moisture absorption is considered to be caused by intrusion of water molecules into fine pores. Accordingly, the carbonaceous material according to the present invention is considered to have a physical or chemical structure which does not allow water molecules to easily intrude into such fine pores.

The carbonaceous material according to the present invention has a lithium doping capacity which remarkably exceeds a theoretical value calculated from a graphite intercalation compound of lithium $LiC_6$. Accordingly, lithium doping the carbonaceous material of the present invention is considered to be present also in a state other than the state forming the graphite intercalation compound. It is assumed that fine pores contribute to doping and dedoping of lithium in a state other than the graphite intercalation compound.

The carbonaceous material according to the present invention has an X-ray scattering intensity ratio $I_W/I_D$ of at least 0.25, preferably 0.30–1.00.

The carbonaceous material according to the present invention has a carbon dioxide adsorption capacity of at least 10 ml/g. A carbonaceous material having a carbon dioxide adsorption capacity below 10 ml/g is not desirable because of a smaller doping capacity for an active substance, such as lithium. Such a carbonaceous material having a smaller carbon dioxide adsorption capacity is considered to have a non-developed pore structure or be rich in pores not allowing the intrusion of carbon dioxide, such as closed pores.

In the carbonaceous material according to the present invention, an active substance may be occluded also in fine pores, and such a carbonaceous material having a smaller carbon dioxide adsorption capacity is considered to have few pores allowing the occlusion of an active substance, thereby showing a smaller active substance doping capacity.

The carbonaceous material according to the present invention has a carbon dioxide adsorption capacity of at least 10 ml/g, preferably at least 20 ml/g, further preferably 30–100 ml/g.

The carbonaceous material according to the present invention has an atomic ratio H/C between hydrogen atoms and carbon atoms according to elementary analysis (hereinafter, sometimes simply referred to as "H/C") of at most 0.1. A carbonaceous material is generally caused to have a lower H/C as a final heat-treatment temperature for production thereof is increased. A carbonaceous material having an H/C exceeding 0.1 is caused to have an undesirably large irreversible capacity for an active substance, calculated as a difference between a doping capacity and a dedoping capacity for the active substance. H/C may preferably be at most 0.08, further preferably at most 0.06.

The carbonaceous material according to the present invention may preferably have a $d_{002}$ (i.e., an average layer plane spacing between (002) planes according to X-ray diffraction) of at least 0.360 nm and at most 0.400 nm.

In case where a non-aqueous solvent-type secondary battery is constituted by using a negative electrode comprising a carbonaceous material having $d_{002}$ below 0.360 nm, the negative electrode is caused to have a smaller doping capacity for the cell active substance. A carbonaceous material having $d_{002}$ exceeding 0.400 nm is caused to have an increased irreversible capacity, calculated as a difference between a doping capacity and a dedoping capacity, for an active substance. It is further preferred that $d_{002}$ is 0.365 nm–0.395 nm, particularly preferably 0.370 nm–0.390 nm.

The carbonaceous material according to the present invention may be produced by carbonizing an aromatic condensation polymer formed by condensation between an aromatic hydrocarbon compound having a phenolic hydroxyl group and an aldehyde at a temperature of 1050–1400° C., under a pressure exceeding 10 kPa (0.1 atm) while flowing an inert gas, or under a pressure of at most 10 kPa.

The aromatic condensation polymer, as a starting material for the carbonaceous material according to the present invention, may preferably be produced by subjecting 1–3 mols of al aldehyde to polycondensation with 1 mol of an aromatic compound having a phenolic hydroxyl group.

Examples of the aromatic compound having a phenolic hydroxyl group may include: phenol; isomers and mixtures of alkyl phenols, such as cresol, ethylphenol, xylenol and diethylphenol; isomers and mixtures of halogenated phenols, such as chlorophenol, dichlorophenol, and bromophenol; and isomers and mixtures of phenols having aromatic substituents, such as phenylphenol and methylphenylphenol. Among these, it is particularly preferred to use phenol.

Examples of the aldehyde may include: formaldehyde, acetaldehyde, butylaldehyde, and benzaldehyde. Among these, it is suitable to use formaldehyde. The formaldehyde may be used in various forms, such as an aqueous solution and a polymerizate thereof.

The polycondensation reaction may preferably be performed in the presence of a basic catalyst, examples of which may include: sodium hydroxide, potassium hydroxide, lithium hydroxide, sodium carbonate, potassium carbonate, lithium carbonate, and ammonia.

As a result of the polycondensation in the presence of such a basic catalyst, a so-called resol-type condensate may be obtained. The condensate obtained in the initial stage may be cured under further application of heat as it is (i.e., in the form containing the catalyst), or may be cured under heating after it is neutralized with an acid and recovered to provide a condensation polymer (resin).

As a starting material for the carbonaceous material according to the present invention, it is suitable to use a resol-type phenolic resin, that is a condensation product between phenol and an aldehyde.

Then, the thus-obtained condensation polymer is carbonized.

The carbonization may be performed at a temperature of 1050–1400° C., under a pressure exceeding 10 kPa (0.1 atm) while flowing an inert gas, or under a pressure of at most 10 kPa.

The carbonization may be effected by continuously heating the condensation polymer to a final carbonization temperature (1050–1400° C.), or by once effecting a pre-calcination (i.e., preliminary carbonization) at a temperature (e.g., below 800° C.) lower than the final carbonization temperature and then effecting a main-calcination (i.e., final carbonization). More specifically, in the latter case, the condensation polymer may be pre-calcined at 350–700° C. in an inert atmosphere (e.g., in an atmosphere of an inert gas, such as nitrogen gas or argon gas, or under a reduced pressure), and then pulverized into a powdery carbon precursor having an average particle size of at most 100 μm, preferably at most 50 μm, followed by main-calcination of the powdery carbon precursor to produce a powdery carbonaceous material.

The main-calcination may be performed under a pressure exceeding 10 kPa under an inert gas stream. In this instance, the material to be carbonized (phenolic resin as it is or after pre-calcination as desired) may be disposed in a piled layer within a reactor and is carbonized while flowing the inert gas in a space outside but in contact with the layer (outside-layer flow scheme), or the material to be carbonized is disposed in a layer or bed and is carbonized while flowing the inert gas through within the layer or bed of the material (intra-layer flow scheme).

In a batch-wise outside-layer flow scheme, it is preferred to suppress the piled layer thickness of the material to be carbonized as thin as possible so as to increase the area of contact of the material layer with the inert gas and allow quick removal of the decomposition product from the material out of the system. The piled layer thickness of the material to be carbonized may preferably be at most 50 mm, more preferably at most 30 mm. The inert gas may be supplied or flowed at a vacant reactor-basis speed of at least 1 mm/sec, more preferably at least 5 mm/sec.

It is preferred to adopt an intra-layer flow scheme of a continuous-type or a batch-type using a fluidized bed, a fixed bed, etc. In this case, the inert gas may preferably be supplied or flowed at a rate of at least 10 ml/min., more preferably at least 50 ml/min., further preferably at least 100 ml/min., per gram of the material to be carbonized, while it can depend on the amount of the material to be carbonized per unit time. A higher inert gas supply rate may be preferred in view of the properties of the product carbonaceous material, but practically the supply rate may be at most 500 ml/min. per gram of the material to be carbonized.

The inert gas (such as nitrogen, argon or helium) can contain a halogen gas, such as chlorine, in an amount of up to 40 mol. % of the resultant gaseous mixture.

The main-calcination may also be performed at 1050–1400° C. under a reduced pressure of at most 10 kPa (0.1 atm). In order to prevent the oxidation of the carbon precursor under calcination, the calcination should preferably be performed in a reduced pressure atmosphere wherein an oxidizing gas, such as oxygen, is not present, but only an inert gas, such as nitrogen or argon, is allowed to be present. When the reduced pressure exceeds 10 kPa in the absence of a flowing inert gas stream, the removal of the resultant decomposition gas from the calcined product is liable to be insufficient, so that the formation of fine pores is liable to be insufficient. The pressure may preferably be at most 1 kPa, further preferably at most 0.1 kPa.

In case where the main-calcination temperature is below 1050° C., the carbonization is liable to be insufficient to result in a carbonaceous material failing to provide an X-ray scattering intensity ratio $I_W/I_D$ of at least 0.25, and an electrode for a secondary battery formed from the carbonaceous material is liable to result in a large irreversible capacity, i.e., an amount of cell active substance introduced to dope the carbonaceous material but not allowed to be dedoped to remain in the carbonaceous material. On the other hand, in case where the main-calcination temperature exceeds 1400° C., the resultant carbonaceous material is caused to have a carbon dioxide adsorption capacity below 10 ml/g, thus exhibiting a smaller doping capacity for cell active substance in the carbonaceous material.

The main-calcination is performed at 1050–1400° C., preferably 1100–1400° C., further preferably 1100–1350° C.

The carbonaceous material according to the present invention has a micro-texture suitable for doping with lithium and is suitably used as an electrode material for constituting a negative electrode or a positive electrode to be doped with lithium. The carbonaceous material is especially suitably used as an electrode material for a non-aqueous solvent-type secondary battery particularly as an electrode material for constituting a negative electrode in a non-aqueous solvent-type lithium secondary battery.

The non-aqueous solvent-type secondary beattery according to the present invention has a negative electrode and a positive electrode, at least one of which comprises a carbonaceous material prepared in the above-described manner.

FIG. 1 is a partially exploded perspective view of a lithium secondary battery as an embodiment of the non-aqueous solvent-type secondary battery according to the present invention.

More specifically, the secondary battery basically includes a laminate structure including a positive electrode 1, a negative electrode 2 and a separator 3 disposed between the positive and negative electrodes 1 and 2 and comprising a fine porous film of a polymeric material, such as polyethylene or polypropylene, impregnated with an electrolytic solution. The laminate structure is wound in a vortex shape to form an electricity-generating element which is housed within a metal casing 5 having a bottom constituting a negative electrode terminal 5a. In the secondary battery, the negative electrode 2 is electrically connected to the negative electrode terminal 5a, and the uppermost portion of the battery is constituted by disposing a gasket 6 and a safety valve 7 covered with a top plate 8 having a projection constituting a positive electrode terminal 8a electrically connected to the positive electrode. Further, the uppermost rim 5b of the casing 5 is crimped toward the inner side to form an entirely sealed cell structure enclosing the electricity-generating element.

Figure 2:
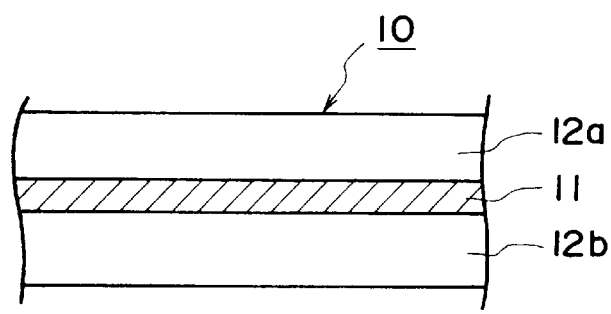
FIG. 2 is a partial sectional view of an electrode structure adopted in the secondary battery.

Herein, the positive electrode 1 or negative electrode 2 may be constituted by an electrode structure 10 having a sectional structure as partially shown in FIG. 2. More specifically, the electrode structure 10 includes an electroconductive substrate 11 comprising a foil or wire net of a metal, such as iron, stainless steel, copper, aluminum, nickel or titanium and having a thickness of, e.g., 5–100 $\mu$m, or 5–20 $\mu$m for a small-sized battery, and a composite electrode layer (12a, 12b) of, e.g., 10–1000 $\mu$m, preferably 10–200 $\mu$m, in thickness for a small-sized battery, on at least one surface, preferably on both surfaces as shown in FIG. 2, of the electroconductive substrate 11.

The composite electrode layers 12a and 12b are respectively a layer comprising a particulate carbonaceous material according to the present invention and a binder, such as a vinylidene fluoride resin, or a positive electrode material comprising a composite oxide of cobalt or nickel and lithium, an electroconductive material such as electroconductive carbon, optionally included, and a binder such as a vinylidene fluoride resin.

More specifically, in case of using the carbonaceous material according to the present invention for producing an electrode 10 (in FIG. 2; 1 or 2 in FIG. 1) of a non-aqueous solvent-type secondary battery as described above, the carbonaceous material may be optionally formed into fine particles having an average particle size of 5–100 $\mu$m and then mixed with a binder stable against a non-aqueous solvent, such as polyvinylidene fluoride, polytetrafluoroethylene or polyethylene, to be applied onto an electroconductive substrate 11, such as a circular or rectangular metal plate, to form, e.g., a 10–200 $\mu$m-thick layer. The binder may preferably be added in a proportion of 1–20 wt. % of the carbonaceous material. If the amount of the binder is excessive, the resultant electrode is liable to have too large an electric resistance and provide the battery with a large internal resistance. On the other hand, if the amount of the binder is too small, the adhesion of the carbonaceous material particles with each other and with the electroconductive substrate 11 is liable to be insufficient. The above described formulation and values have been set forth with respect to production of a secondary battery of a relatively small size, whereas, for production of a secondary battery of a larger size, it is also possible to form the above-mentioned mixture of the carbonaceous material fine particles and the binder into a thicker shaped product, e.g., by press-forming, and electrically connect the shaped product to the electroconductive substrate.

The carbonaceous material of the present invention can also be used as a positive electrode material for a non-aqueous solvent-type secondary battery by utilizing its good doping characteristic but may preferably be used as a negative electrode material of a non-aqueous solvent-type secondary battery, particularly for constituting a negative electrode to be doped with lithium as an active substance of a lithium secondary battery.

In the latter case, the positive electrode material may comprise a complex metal chalcogenide, particularly a complex metal oxide, such as $LiCoO_2$, $LiNiO_2$, $LiMnO_4$ or $LiMn_2O_4$. Such a positive electrode material and an electroconductive material, such as carbon black, may be formed alone or in combination with an appropriate binder into a layer on an electroconductive substrate.

The non-aqueous solvent-type electrolytic solution used in combination with the positive electrode and the negative electrode described above may generally be formed by dissolving an electrolyte in a non-aqueous solvent. The non-aqueous solvent may comprise one or two or more species of organic solvents, such as propylene carbonate, ethylene carbonate, dimethyl carbonate, diethyl carbonate, dimethoxyethane, diethoxyethane, -butyrolactone, tetrahydrofuran, 2-methyl-tetrahydrofuran, sulfolane, and 1,3-dioxolane. Examples of the electrolyte may include $LiClO_4$, $LiPF_6$, $LiBF_4$, $LiCF_3SO_3$, $LiAsF_6$, LiCl, LiBr, $LiB(C_6H_5)_4$, and $LiN(SO_2CF_3)_2$.

As described above, a secondary battery of the present invention may generally be formed by disposing the above-formed positive electrode 1 and negative electrode 2 opposite to each other, optionally with a liquid-permeable separator 3 composed of, e.g., unwoven cloth or other porous materials, disposed therebetween, and dipping the positive and negative electrodes together with an intermediate permeable separator in an electrolytic solution as described above.

In the above, a cylindrical battery has been described as an embodiment of the non-aqueous solvent-type secondary battery according to the present invention. However, the non-aqueous solvent-type secondary battery according to the present invention can basically have any other shapes, such as those of a coin, a rectangular parallelepiped, or a paper or sheet.

Incidentally, various parameters of carbonaceous materials described herein, i.e., the hydrogen/carbon atomic ratio H/C, X-ray scattering intensity ratio $I_W/I_D$, average (002) layer plane spacing $d_{002}$ and carbon dioxide adsorption capacity, are based on values measured in the following manners.

[H/C Ratio of Carbonaceous Materials]

Calculated from elementary analysis data according to a CHN analyzer.

[X-Ray Scattering Intensity Ratio $I_W/I_D$]

A dry-state carbon sample and a wet-state carbon sample are provided in the following manner.

That is, a carbonaceous material is dried under vacuum for 5 hours at 150° C. in a vacuum drier to provide a dry-state carbon sample. Further, 0.3 ml of deionized water is added to and sufficiently blended with 1 g of such a dry-state carbon sample in an agate mortar to provide a wet-state carbon sample. The wet-state carbon sample immediately after the blending of water and the carbonaceous material is charged in a sample holder and then left standing for 10–15 min. to be used for measurement.

In the X-ray small-angle scattering measurement, a parameter s is defined as follows:

$$s=2 \cdot \sin \theta / \lambda,$$

wherein $\theta$ denotes a scattering angle and $\lambda$ denotes a wavelength of X-rays. The X-ray small-angle scattering measurement is performed by using an apparatus available from K.K. Rigaku under the following conditions.

X-ray generator: High luminance Rotaflex RU-20OBH

X-ray source: Point focus, CuKα (through Ni filter)

X-ray power: 50 kV-20 mA

Goniometer: Model 2203E1

Slit diameter: (1st) 0.2 mm—(2nd) 0.2 mm

X-ray vacuum path device: Accessory for the goniometer (Model 2203E1)

Detector: Model PSPC-5 (effective length: 100 mm, PR gas (90% argon +10% methane) flow)

Window height regulation slit width: 4 mm

Camera length: 271 mm

Measurement time: 1000 sec

In operation of the above apparatus, the X-ray vacuum path device between a sample holder (comprising a 1.5 mm-thick aluminum plate having an area of 35×50 mm² and provided with an opening of 20×18 mm²) and the detector is evacuated to establish a vacuum. X-ray scattering intensity measurement is performed twice, i.e., to measure a scattering intensity $I_m(s)$ when the sample holder is filled with a powdery carbonaceous material sample (while applying a polyethylene film ("ONEWRAP", available from Jujo Tokushu Shiki K.K.) on both sides of the sample holder so as to prevent the falling of the powdery sample) and to measure an X-ray scattering intensity B(s) when the sample holder is not filled with any sample. In this case, the coherent scattering intensity $I_G(s)$ of the sample per unit weight is given by the following equation:

$$I_G(s)=(I_m(s)-A \cdot B(s))/(A \cdot 1 \ nA),$$

wherein A is an absorption factor of the powdery carbonaceous material sample determined by using an X-ray wide-angle scattering apparatus in the following manner.

Figure 3:
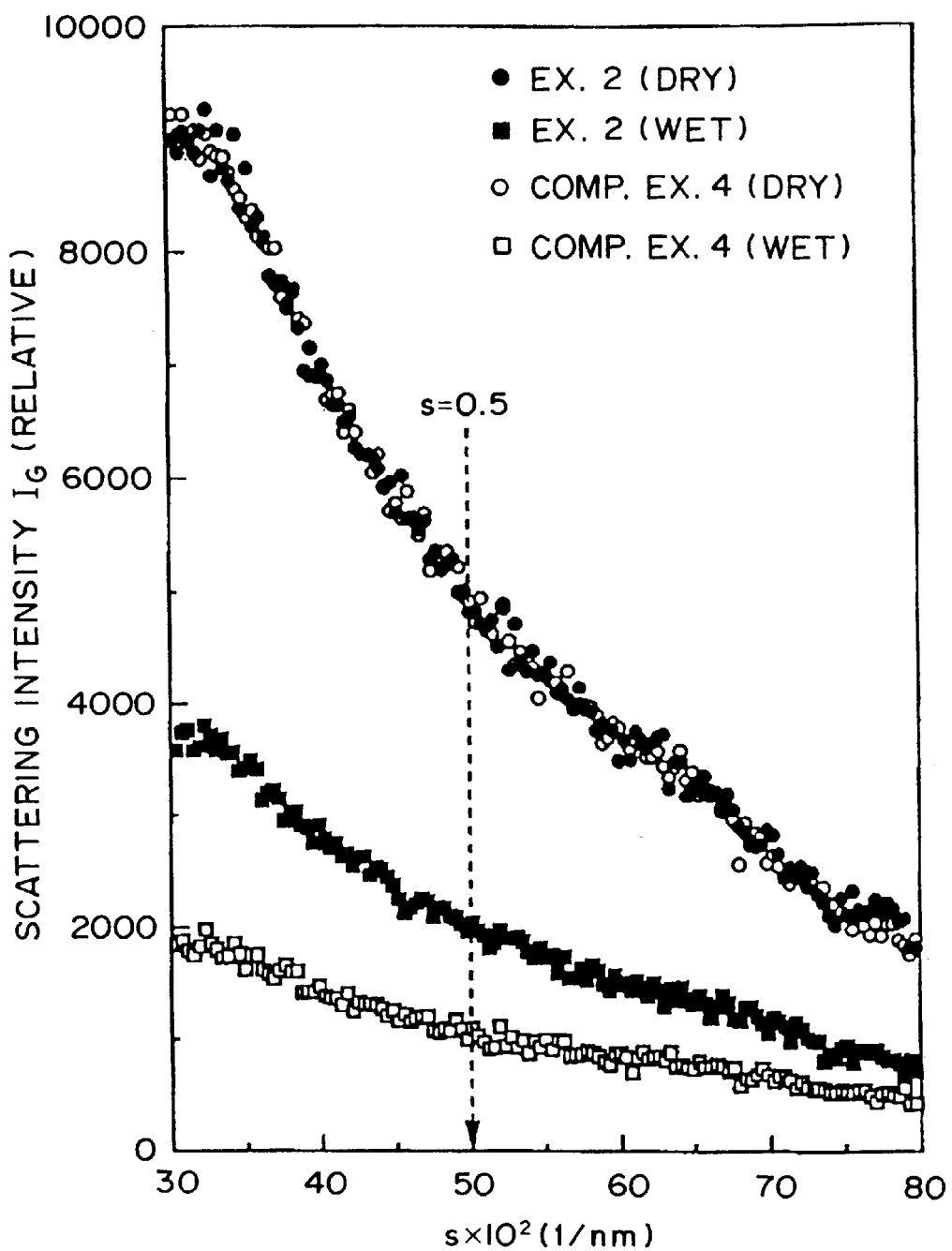
FIG. 3 is a graph showing plotted data of scattering intensities $I_G$ versus parameter $\underline{s}$ for the carbonaceous materials of Example 2 and Comparative Example 4 respectively in the dry state and the wet state respectively.

Thus, (111) diffraction rays from standard high-purity silicon powder are made monochromatic by passing through an Ni filter. The diffraction rays are caused to pass through a sample holder containing a carbonaceous material sample to measure an intensity is and also caused to pass through the sample holder containing no sample to measure an intensity $I_0$. From these values, the absorption factor A is determined from the equation: $A=I_S/I_0$. (Incidentally, FIG. 3 shows plotted data of thus-obtained scattering intensities $I_G$ versus s values in a dry state and in a wet state for carbonaceous materials of Example 2 and Comparative Example 4 described hereinafter.)

From the above-measured values, a scattering intensity $I_G$ (0.5) corresponding to s=0.5 is calculated.

The scattering intensity $I_G(0.5)$ thus obtained can vary depending on the intensity of incident X-rays, etc., so that the scattering intensity of a carbonaceous material sample is normalized by using a scattering intensity due to air in the X-ray path between the sample holder and the detector. More specifically, in the above-mentioned small-angle scattering meter, the sample holder is filled with no sample, and the X-ray vacuum path device between the sample holder and the detector is filled with air at 1 atm, thereby measuring a scattering intensity $I_A(0.5)$ of the air in the X-ray vacuum path device. By using the $I_A(0.5)$ value, a normalized scattering intensity $I_S(0.5)$ of the carbonaceous material sample is obtained according to the following equation:

$$I_S(0.5)=I_G(0.5)/I_A(0.5).$$

The scattering intensity $I_S(0.5)$ measured in the above-described manner is denoted by $I_D$ when measured with respect to a carbonaceous material in a dry state and by $I_W$ when measured with respect to the carbonaceous material in a wet state, whereby an X-ray scattering intensity ratio $I_W/I_D$ is calculated.

[Carbon Dioxide Adsorption Capacity]

A carbonaceous material sample is dried under vacuum at 130° C. for at least 3 hours by using a vacuum drier to provide a sample for measurement of carbon dioxide adsorption capacity by an apparatus ("ASAP-2000M", available from Micromeritics Instrument Corporation).

For measurement, 0.5 g of such a sample is placed in a sample tube and dried under a vacuum of at most 0.2 Pa at 300° C. for at least 3 hours, and thereafter the measurement of a carbon dioxide adsorption capacity is performed.

At a set adsorption temperature of 0° C., the sample tube containing the measurement sample is evacuated to a reduced pressure of at most 0.6 Pa, and then carbon dioxide gas is introduced and adsorbed by the sample until an equilibrium pressure of 0.11 MPa (corresponding to a relative pressure of 0.032) according to the constant volume method to measure a carbon dioxide adsorption capacity in terms of ml/g calculated under a standard state (STP).

[$d_{002}$ of Carbonaceous Material]

A powdery sample of a carbonaceous material was packed in an aluminum-made sample cell and irradiated with monochromatic CuKα rays (wavelength λ=0.15418 nm) through a graphite monochromator to obtain an X-ray diffraction pattern by a reflection-type diffractometer. As for correction of the diffraction pattern, no correction is performed regarding Lorentz polarization factor, absorption factor or atomic scattering factor, but only correction of double lines of $K\alpha_1$, $K\alpha_2$ according to the Rachinger's method. The peak position of the (002) diffraction lines is determined by the center of gravity method (i.e., a method wherein the position of a gravity center of diffraction lines is obtained to determine a peak position as a 2θ value corresponding to the gravity center) and calibrated by the diffraction peak of (111) plane of high-purity silicon powder as the standard substance. The $d_{002}$ value is calculated from the Bragg's formula shown below.

$d_{002}=\lambda/(2\cdot\sin\theta)$ (Bragg's formula)

EXAMPLES

Hereinbelow, the present invention will be described more specifically based on Examples and Comparative Examples.

Example 1

94.2 g of phenol (reagent-grade, available from Kanto Kagaku K.K.) and 80.6 g of 37%-formalin were placed in a separable flask equipped with a Dimroth condenser, and stirred for mixing therein, followed further by addition of 14.0 g of 20% sodium hydroxide aqueous solution and stirring for mixing. The resultant solution was reacted at a temperature of 85–95° C. for 6 hours on a mantle heater. After the reaction, the reaction product was cooled to room temperature to obtain 152 g of phenol-formaldehyde initial condensate. The initial condensate was placed in a vessel formed by a copper foil and cured at 150° C. for 12 hours in a drier ("EYELA NED-300", available from Tokyo Rika Kiki K.K.) to obtain 95 g of a phenolic resin. Then, the phenolic resin was crushed to diameters of ca. 1–2 cm, heated to 600° C. at a rate of 200° C./h in a nitrogen gas atmosphere (normal pressure) and held at 600° C. for 1 hour for pre-calcination to obtain a carbon precursor. The carbon precursor was pulverized to form a powdery carbon precursor having an average particle size of 25 μm. Then, the powdery carbon precursor was charged in a vacuum calcination furnace, heated to 1100° C. at a rate of 5° C./min and held at 1100° C. for 1 hour for main calcination under a reduced pressure maintained at 1 kPa or below, followed by cooling to obtain a powdery carbonaceous material.

The properties of the thus-prepared carbonaceous material are shown in Table 1 together with those of carbonaceous material obtained in Examples and Comparative Examples described below.

Examples 2 and 3

Carbonaceous materials were prepared in the same manner as in Example 1 except for changing the main calcination temperature to 1200° C. (Example 2) and 1300° C. (Example 3), respectively.

Example 4

5 g of the powdery carbon precursor prepared in Example 1 was charged in a horizontal tubular furnace (inner diameter=100 mm) and heated to 1200° C. at a rate of 5° C./min and held at 1200° C. for 1 hour for main calcination under a nitrogen stream (of 10 liter/min at a pressure of 1 atm), followed by cooling to produce a powdery carbonaceous material.

Example 5

48.0 g of phenol and 82.6 g of 37%-formalin were placed in a separable flask equipped with a Dimroth condenser, and stirred for mixing therein, followed further by addition of 3.8 g of 29% ammonia water and stirring for mixing. The resultant solution was reacted at a temperature of 70–80° C. for 6.5 hours on a mantle heater. After the reaction, the reaction product was cooled to room temperature to obtain 78 g of phenol-formaldehyde initial condensate. The initial condensate was placed in a vessel formed by a copper foil and cured at 150° C. for 12 hours in a drier to obtain 60 g of a phenolic resin. Then, the phenolic resin was crushed to diameters of ca. 1–2 cm, heated to 600° C. at a rate of 200° C./h in a nitrogen gas atmosphere (normal pressure) and held at 600° C. for 1 hour for pre-calcination to obtain a carbon precursor. The carbon precursor was pulverized to form a powdery carbon precursor having an average particle size of 25 μm. Then, the powdery carbon precursor was charged in a vacuum calcination furnace, heated to 1200° C. at a rate of 5° C./min and held at 1200° C. for 1 hour for main calcination under a reduced pressure maintained at 1 kPa or below, followed by cooling to obtain a powdery carbonaceous material.

Example 6

122.0 g of 3,5-xylenol (reagent-grade, available from Kanto Kagaku K.K.) and 81.0 g of 37%-formalin were placed in a separable flask equipped with a Dimroth condenser, and stirred for mixing therein, followed further by addition of 12.0 g of 20% sodium hydroxide aqueous solution and stirring for mixing. The resultant solution was reacted at a temperature of 90–98° C. for 3 hours on a mantle heater. After the reaction, the reaction product was cooled to room temperature and neutralized by addition of 12.0 g of lactic acid, followed by removal of the supernatant liquid to obtain an initial condensate. The initial condensate was placed in a vessel formed by a copper foil and cured at 150° C. for 12 hours in a drier to obtain a xylenol resin. Then, the xylenol resin was crushed to diameters of ca. 1–2 cm, heated to 600° C. at a rate of 200° C./h in a nitrogen gas atmosphere (normal pressure) and held at 600° C. for 1 hour for pre-calcination to obtain a carbon precursor. The carbon precursor was pulverized to form a powdery carbon precursor having an average particle size of 25 μm. Then, the powdery carbon precursor was charged in a vacuum calcination furnace, heated to 1200° C. at a rate of 5° C./min and held at 1200° C. for 1 hour for main calcination under a reduced pressure maintained at 1 kPa or below, followed by cooling to obtain a powdery carbonaceous material.

Comparative Examples 1 and 2

Carbonaceous materials were prepared in the same manner as in Example 1 except for changing the main calcination temperature to 1000° C. (Comparative Example 1) and 1500° C. (Comparative Example 2), respectively.

Comparative Example 3

142.0 g of phenol and 122.5 g of 37%-formalin were placed in a separable flask equipped with a Dimroth condenser, and stirred for mixing therein, followed further by addition of 17.5 g of magnesium hydroxide and stirring for mixing. The resultant solution was reacted at a temperature of 84–99° C. for 3 hours on a mantle heater. After the reaction, the reaction product was cooled to room temperature, and the supernatant liquid was removed to obtain 165 g of an initial condensate. The initial condensate was placed in a vessel formed by a copper foil and cured at 150° C. for 12 hours in a drier to obtain 152 g of a phenolic resin. Then, the phenolic resin was crushed to diameters of ca. 1–2 cm, heated to 600° C. at a rate of 200° C./h in a nitrogen gas atmosphere (normal pressure) and held at 600° C. for 1 hour for pre-calcination to obtain 88 g of a carbon precursor. The carbon precursor was pulverized to form a powdery carbon precursor having an average particle size of 25 μm. Then, the powdery carbon precursor was charged in a vacuum calcination furnace, heated to 1200° C. at a rate of 5° C./min and held at 1200° C. for 1 hour for main calcination under a reduced pressure maintained at 1 kPa or below, followed by cooling to obtain a powdery carbonaceous material.

Comparative Example 4

A commercially available phenolic resin precursor ("BELL PEARL S830", available from Kanebo K.K.) was placed in a vessel formed of a copper foil and cured at 150° C. for 12 hours in a drier to obtain a phenolic resin. Then, the phenolic resin was crushed to diameters of ca. 1–2 cm, heated to 600° C. at a rate of 200° C./h in a nitrogen gas atmosphere (normal pressure) and held at 600° C. for 1 hour for pre-calcination to obtain a carbon precursor. The carbon precursor was pulverized to form a powdery carbon precursor having an average particle size of 25 μm. Then, the powdery carbon precursor was charged in a vacuum calcination furnace, heated to 1200° C. at a rate of 5° C./min and held at 1200° C. for 1 hour for main calcination under a reduced pressure maintained at 1 kPa or below, followed by cooling to obtain a powdery carbonaceous material.

Comparative Example 5

94.1 g of phenol and 81.1 g of 37%-formalin were placed in a separable flask equipped with a Dimroth condenser, and stirred for mixing therein, followed further by addition of 14.0 g of 20% sodium hydroxide aqueous solution and stirring for mixing. The resultant solution was reacted at a temperature of 85–95° C. for 6 hours on a mantle heater. After the reaction, the reaction product was cooled to room temperature and neutralized by gradual addition of 7.0 g of 10% hydrochloric acid, followed by removal of the supernatant liquid to obtain 104 g of an initial condensate. The initial condensate was placed in a vessel formed by a copper foil and cured at 150° C. for 12 hours in a drier to obtain 62 g of a phenolic resin. Then, the phenolic resin was crushed to diameters of ca. 1–2 cm, heated to 600° C. at a rate of 200° C./h in a nitrogen gas atmosphere (normal pressure) and held at 600° C. for 1 hour for pre-calcination to obtain a carbon precursor. The carbon precursor was pulverized to form a powdery carbon precursor having an average particle size of 25 μm. Then, the powdery carbon precursor was charged in a vacuum calcination furnace, heated to 1200° C. at a rate of 5° C./min and held at 1200° C. for 1 hour for main calcination under a reduced pressure maintained at 1 kPa or below, followed by cooling to obtain a powdery carbonaceous material.

Comparative Example 6

48.0 g of phenol and 82.7 g of 37%-formalin were placed in a separable flask equipped with a Dimroth condenser, and stirred for mixing therein, followed further by addition of 3.8 g of 29% ammonia water and stirring for mixing. The resultant solution was reacted at a temperature of 85–95° C. for 1.5 hours on a mantle heater. After the reaction, the reaction product was cooled to room temperature to obtain 78 g of an initial condensate. The initial condensate was placed in a vessel formed by a copper foil and cured at 150° C. for 12 hours in a drier to obtain 59 g of a phenolic resin. Then, the phenolic resin was crushed to diameters of ca. 1–2 cm, heated to 600° C. at a rate of 200° C./h in a nitrogen gas atmosphere (normal pressure) and held at 600° C. for 1 hour for pre-calcination to obtain a carbon precursor. The carbon precursor was pulverized to form a powdery carbon precursor having an average particle size of 25 μm. Then, the powdery carbon precursor was charged in a vacuum calcination furnace, heated to 1100° C. at a rate of 5° C./min and held at 1100° C. for 1 hour for main calcination under a reduced pressure maintained at 1 kPa or below, followed by cooling to obtain a powdery carbonaceous material.

Comparative Example 7

To 108 g of ortho-cresol, 32 g of para-formaldehyde, 242 g of ethyl cellosolve and 10 g of sulfuric acid were added, and the resultant mixture was subjected to 3 hours of reaction at 115° C. and then neutralized by adding 17 g of sodium hydrogen carbonate and 30 g of water. The resultant reaction solution was charged into 2 liter of water under high-speed stirring to obtain a novolak resin. Then, 17.3 g of the novolak resin and 2.0 g of hexamethylenetetramine were kneaded at 120° C., and heated at 250° C. for 2 hours in a nitrogen gas atmosphere to obtain a cured resin. The cured resin was coarsely crushed, pre-calcined at 600° C. for 1 hour in a nitrogen atmosphere (normal pressure) and then heat-treated at 1900° C. for 1 hour in an argon gas atmosphere (normal pressure) to obtain a carbonaceous material, which was then pulverized to an average particle size of 15 μm.

Comparative Example 8

122.0 g of 3,5-xylenol and 81.0 g of 37%-formalin were placed in a separable flask equipped with a Dimroth condenser, and stirred for mixing therein, followed further by addition of 4.0 g of 29% ammonia water and stirring for mixing. The resultant solution was reacted at a temperature of 90–98° C. for 3 hours on a mantle heater. After the reaction, the reaction product was cooled to room temperature and neutralized by adding 12 ml of lactic acid, followed by removal of the supernatant liquid to obtain an initial condensate. The initial condensate was placed in a vessel formed by a copper foil and cured at 150° C. for 12 hours in a drier to obtain a xylenol resin. Then, the xylenol resin was crushed to diameters of ca. 1–2 cm, heated to 600° C. at a rate of 200° C./h in a nitrogen gas atmosphere (normal pressure) and held at 600° C. for 1 hour for pre-calcination to obtain a carbon precursor. The carbon precursor was pulverized to form a powdery carbon precursor having an average particle size of 25 μm. Then, the powdery carbon precursor was charged in a vacuum calcination furnace, heated to 1200° C. at a rate of 5° C./min and held at 1200° C. for 1 hour for main calcination under a reduced pressure maintained at 1 kPa or below, followed by cooling to obtain a powdery carbonaceous material.

[Doping/De-Doping Capacity for Active Substance]

The carbonaceous materials obtained in Examples and Comparative Examples were respectively used to prepare a non-aqueous solvent-type secondary battery (cell) and the performances thereof were evaluated in the following manner.

The carbonaceous material according to the present invention is generally suited for constituting a negative electrode of a non-aqueous solvent secondary battery. However, in order to accurately evaluate the performances of a carbonaceous material inclusive of a doping capacity (A) and a de-doping capacity (B) and also a non-dedoping capacity (A–B) for a cell active substance without being affected by a fluctuation in performance of a counter electrode material, a large excess amount of lithium metal showing a stable performance was used as a negative electrode, and each carbonaceous material prepared above was used to constitute a positive electrode, thereby forming a lithium secondary battery, of which the performances were evaluated.

More specifically, the positive electrode (carbon electrode) was prepared as follows. That is, 90 wt. parts of the carbonaceous material thus formulated in the form of fine particles and 10 wt. parts of polyvinylidene fluoride were mixed together with N-methyl-2-pyrrolidone to form a paste composite, which was then applied uniformly onto an aluminum foil. The composite, after being dried, was peeled off the aluminum foil and stamped into a 15 mm-dia. disk carbonaceous film. Separately, a 16 mm-dia. stainless steel net disk was spot-welded to an inner lid of a coin-shaped battery can of 2016 size (i.e., a diameter of 20 mm and a thickness of 1.6 mm), and the above-formed disk-shaped carbonaceous film was press-bonded onto the 16 mm-dia. steel net disk to form a positive electrode containing ca. 20 mg of the carbonaceous material. On the other hand, a negative electrode (lithium electrode) was prepared in an argon gas atmosphere within a glove box. In advance, a 16 mm-dia. stainless steel net disk was spot-welded to an outer lid of the coin-shaped battery can of the 2016 size, and a 16 mm-dia. disk stamped out of a 0.5 mm-thick metal lithium sheet was press-bonded onto the steel net disk to prepare a negative electrode.

By using the thus-prepared positive and negative electrodes together with an electrolytic solution prepared by dissolving $LiClO_4$ at a ratio of 1 mol/liter in a 1:1 (by volume)-mixture of propylene carbonate and dimethoxyethane, a fine porous membrane of polypropylene as a separator, and a polyethylene-made gasket, a coin-shaped non-aqueous solvent-type lithium secondary battery of the 2016 size.

In the lithium secondary battery thus constituted, the carbonaceous material in the positive electrode was subjected to doping and dedoping of lithium to evaluate capacities therefor. More specifically, the doping was effected by repeating a cycle including 1 hour of current conduction at a current density of 0.5 $mA/cm^2$ and 2 hours of pause until the equilibrium potential between the positive and negative electrodes reached 4 mV. The electricity thus flowed was divided by the weight of the carbonaceous material to provide a doping capacity (A) in terms of Ah/kg. Then, in a similar manner, a current was flowed in a reverse direction to dedope the lithium from the doped carbonaceous material. The de-doping was effected by repeating a cycle including 1 hour of current conduction at a current density of 0.5 $mA/cm^2$ and 2 hours of pause, down to a cut-off voltage of 1.5 volts. The electricity thus flowed was divided by the weight of the carbonaceous material to provide a dedoping capacity (B) in terms of Ah/kg. Then, a non-dedoping capacity (A–B) was calculated as a difference between the doping capacity (A) and the dedoping capacity (B), and a discharge efficiency (%) was obtained by dividing the dedoping capacity (B) with the doping capacity (A) and multiplying the quotient (B/A) with 100. The discharge efficiency is a measure of effective utilization of the active substance.

The performances of the lithium secondary batteries using positive electrodes of the respective carbonaceous materials measured in the above-described manner are summarized in the following Table 2.

TABLE 1

|  | Starting material | Polymn. catalyst | Main calcn. temp. (° C.) | H/C | $I_W/I_D$ | $d_{002}$ (nm) | $ACO_2$* (ml/g) |
|---|---|---|---|---|---|---|---|
| Ex. 1 | phenolic resin | NaOH | 1100 | 0.03 | 0.42 | 0.385 | 40.1 |
| 2 | phenolic resin | NaOH | 1200 | 0.03 | 0.41 | 0.383 | 38.5 |
| 3 | phenolic resin | NaOH | 1300 | 0.02 | 0.42 | 0.380 | 38.7 |
| 4 | phenolic resin | NaOH | 1200 | 0.03 | 0.40 | 0.384 | 45.1 |
| 5 | phenolic resin | $NH_3$ | 1200 | 0.03 | 0.38 | 0.382 | 44.0 |
| 6 | xylenol resin | NaOH | 1200 | 0.03 | 0.32 | 0.387 | 45.5 |
| COMP. Ex. 1 | phenolic resin | NaOH | 1000 | 0.04 | 0.24 | 0.393 | 77.3 |
| 2 | phenolic resin | NaOH | 1500 | 0.01 | 0.38 | 0.374 | 0.3 |
| 3 | phenolic resin | $Mg(OH)_2$ | 1200 | 0.03 | 0.23 | 0.391 | 76.2 |
| 4 | BELLPEARL S830 | unknown | 1200 | 0.03 | 0.22 | 0.385 | 83.0 |
| 5 | phenolic resin | NaOH | 1200 | 0.03 | 0.22 | 0.383 | 85.0 |
| 6 | phenolic resin | $NH_3$ | 1100 | 0.03 | 0.22 | 0.382 | 74.6 |
| 7 | cresol resin | $H_2SO_4$ | 1900 | 0.01 | 0.40 | 0.368 | 0.2 |
| 8 | xylenol resin | $NH_3$ | 1200 | 0.03 | 0.39 | 0.362 | 0.7 |

*$ACO_2$: Carbon dioxide adsorption capacity (ml (STP)/g-carbon)

TABLE 2

Secondary battery performances

|  | Doping capacity (A) (Ah/kg) | Dedoping capacity (B) (Ah/kg) | Non-dedoping capacity (A – B) (Ah/kg) | Discharge efficiency B/A × 100 (%) |
|---|---|---|---|---|
| Ex. 1 | 658 | 545 | 113 | 82.9 |
| 2 | 603 | 527 | 76 | 87.4 |
| 3 | 547 | 486 | 60 | 88.8 |
| 4 | 578 | 501 | 77 | 86.7 |
| 5 | 580 | 496 | 84 | 85.5 |
| 6 | 538 | 474 | 64 | 88.1 |
| COMP. Ex. 1 | 687 | 485 | 202 | 70.6 |
| 2 | 216 | 192 | 24 | 88.9 |
| 3 | 659 | 380 | 279 | 57.7 |
| 4 | 536 | 393 | 144 | 73.3 |
| 5 | 607 | 362 | 245 | 59.6 |

TABLE 2-continued

Secondary battery performances

|   | Doping capacity (A) (Ah/kg) | Dedoping capacity (B) (Ah/kg) | Non-dedoping capacity (A − B) (Ah/kg) | Discharge efficiency B/A × 100 (%) |
|---|---|---|---|---|
| 6 | 607 | 429 | 178 | 70.6 |
| 7 | 217 | 167 | 50 | 77.0 |
| 8 | 372 | 313 | 59 | 84.1 |

From the results of Examples and Comparative Examples shown in Tables 1 and 2, the following knowledge may be derived.

The carbonaceous materials of Comparative Examples 1 and 3–6 prepared at main calcination temperatures of 1000–1200° C. comparable to or somewhat lower than 1100–1300° C. of Examples, exhibited small $I_W/I_D$ values of 0.22–0.24 (Table 1) and are believed to have pores, but the carbon structures having pores are not believed to have well developed. As a result, the carbonaceous materials of these Comparative Examples exhibited large doping capacities for cell active substance but small dedoping capacities, thus showing large irreversible capacities, so that these carbonaceous material do not provide effective electrode materials (Table 2).

The carbonaceous materials of Comparative Examples 2 and 7 exhibiting small carbon dioxide adsorption capacities were obtained at main calcination temperatures of 1500° C. and 1900° C., respectively, which were higher than 1100–1300° C. of Examples (Table 1). In other words, in the carbonaceous materials of these Comparative Examples produced through calcination at high main calcination temperatures, it is assumed that pores once produced in the carbonaceous materials were closed due to calcination at high temperatures, so that carbon dioxide gas was not allowed to intrude into the pores, thus resulting in small carbon dioxide adsorbing capacities. This assumption is corroborated by large X-ray scattering intensity ratios $I_W/I_D$. That is, the closed pores not allowing water molecules to intrude thereinto are believed to result in only a small decrease in X-ray scattering intensity of a carbonaceous material in a wet state. However, a cell active substance such as lithium is believed to be occluded not only between carbon layers but also in pores. The carbonaceous materials of Comparative Examples 2 and 7 are believed to exhibit small doping capacities because of a large proportion of closed pores (Table 2).

On the other hand, the carbonaceous material of Comparative Example 8 exhibited a small carbon dioxide adsorption capacity of 0.7 ml/g in spite of a low main calcination temperature of 1200° C. Further, regardless of a low calcination temperature of 1200° C., the carbonaceous material exhibited a small $d_{002}$ value of 0.362 nm which represents a higher degree of crystallization than the carbonaceous materials of Examples. The higher degree of crystallization of the carbonaceous material means that the starting aromatic condensation polymer (xylenol resin) had a lower degree of crosslinking. It is assumed that such an aromatic condensation polymer having a lower degree of crosslinking produced fewer pores during the calcination to result in a carbonaceous material having a lower carbon dioxide adsorption capacity. The carbonaceous material of Comparative Example 8 having a lower carbon dioxide capacity (i.e., having fewer pores) exhibited a small doping capacity for lithium as a cell active substance.

As shown in the results of Examples compared with these of the above-discussed Comparative Examples, the carbonaceous materials of the present invention have been obtained by controlling the crosslinking structure of the starting aromatic condensation polymer and the calcination temperature and further by promoting the dissipation of decomposition gas and tar generated during the calcination, thereby promoting the formation of pores suitable for doping with a cell active substance, such as lithium.

INDUSTRIAL APPLICABILITY

As described above, according to the present invention, there is provided a carbonaceous material having a controlled micro-texture and large doping and dedoping capacities for cell active substance, and therefore suitable as a carbonaceous electrode material for non-aqueous solvent-type secondary battery. By using the carbonaceous material to constitute, e.g., a negative electrode of a lithium secondary battery, it becomes possible to produce a high energy density secondary battery exhibiting a high lithium utilization rate.

What is claimed is:

1. A carbonaceous electrode material for a secondary battery, comprising:
  a carbonization product of an aromatic condensation polymer formed by condensation of an aromatic compound having a phenolic hydroxy group and an aldehyde; and having an atomic ratio H/C between hydrogen atoms and carbon atoms of below 0.1, an average (002)-plane spacing of 0.365–0.395 nm as measured by X-ray diffraction method, a carbon dioxide adsorption capacity of at least 10 ml/g, and an X-ray scattering intensity ratio $I_W/I_D$ of at least 0.25, wherein $I_W$ and $I_D$ represent scattering intensities as measured in a wet state and a dry state, respectively, at a parameter s=2·sin θ/λ, of 0.5 nm$^{-1}$, wherein θ denotes a scattering angle and λ denotes a wavelength of X-rays in 2·sin θ/λ of 0.5 nm$^{-1}$, wherein θ denotes a scattering angle and λ denotes a wavelength of X-rays in X-ray small-angle scattering measurement, and
  wherein the carbonaceous electrode material is particulate in form having an average particle diameter of at most 100 μm.

2. A carbonaceous electrode material according to claim 1, wherein said aromatic condensation polymer is a resol phenolic resin formed by condensation of phenol and an aldehyde.

3. A process for producing the carbonaceous electrode material for a non-aqueous solvent secondary battery according to claim 1, comprising: forming a resol phenolic resin by condensation of an aromatic compound having a phenolic hydroxyl group and an aldehyde in a mol ratio 1 to 1–3 in the presence of a basic catalyst selected from the group consisting of sodium hydroxide, potassium hydroxide, lithium hydroxide, sodium carbonate, potassium carbonate, lithium carbonate and ammonia, pre-calcining and pulverizing the resol phenolic resin to an average particle diameter of at most 100 μm, and carbonizing the pulverized resol phenolic resin at a temperature of 1050–1400° C. under a pressure exceeding 10 kPa in contact with a flowing inert gas.

4. A process for producing a carbonaceous electrode material for a non-aqueous solvent secondary battery as recited in claim 1, comprising: forming a resol phenolic resin by condensation of an aromatic compound having a phenolic hydroxyl group and an aldehyde in a mol ratio of 1 to 1–3 in the presence of a basic catalyst selected from the group consisting of sodium hydroxide, potassium hydroxide, lithium hydroxide, sodium carbonate, potassium carbonate, lithium carbonate and ammonia, pre-calcining and pulverizing the resol phenolic resin to an average particle diameter of at most 100 μm, and carbonizing the pulverized resol phenolic resin at a temperature of 1050–1400° C. under a pressure of at most 10 kPa.

5. An electrode structure for a non-aqueous solvent secondary battery, comprising: an electroconductive substrate and a composite electrode layer disposed on at least one surface of the electroconductive substrate;

said composite electrode layer comprising a carbonaceous electrode material according to claim 1 in a particulate form, and a binder.

6. A non-aqueous solvent secondary battery, comprising: a positive electrode, a negative electrode, and a separator and a non-aqueous electrolytic solution disposed between the positive and negative electrodes;

at least one of said positive and negative electrodes comprising an electrode structure according to claim 5.

7. A secondary battery according to claim 6, wherein the electrode structure constitutes the negative electrode.

* * * * *